United States Patent Office 3,007,915
Patented Nov. 7, 1961

---

3,007,915
SPARINGLY WATER-SOLUBLE AZO DYESTUFFS
Ernest Merian, Bottmingen, Switzerland, assignor to Sandoz Ltd., Basel, Switzerland
No Drawing. Filed May 26, 1958, Ser. No. 737,534
6 Claims. (Cl. 260—153)

This invention relates to new azo dyestuffs which are sparingly soluble in water. They correspond to the general formula

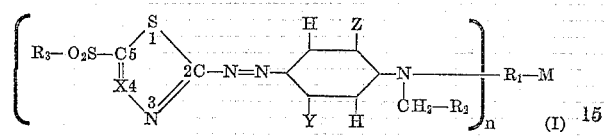

wherein

X stands for nitrogen, C—H, C-alkyl, C—$CF_3$, C-phenyl, C-(methylphenyl), C-(ethylphenyl), C-(dimethylphenyl) or C-(halogenophenyl), $R_3$ for an alkyl or alkylene radical with 1 to 4 carbon atoms which may be substituted by halogen, hydroxy or cyano, or an amino group which may be substituted by one or two alkyl, aralkyl, cycloalkyl or aryl radicals which may also be substituted, Y for hydrogen, halogen, a low molecular alkyl or alkoxy, trifluoromethyl or trifluoroacetyl amino radical, or an alkanoylamino radical with not more than 18 C atoms, $R_1$ for a divalent aliphatic radical with 1 to 4 carbon atoms, $R_2$ for a hydroxyalkyl radical, a dihydroxyalkyl radical, an alkoxyalkyl radical, an acetoxyalkyl radical which may be further substituted, a cyanoalkyl, the difluoromethyl or trifluoromethyl radical, a fluorinated cyanoalkyl, a carbalkoxyalkyl or a carbamic acid alkyl ester radical, $n$ for the number 1 or 2, M for hydrogen, hydroxyl, an alkoxy radical, an acetoxy radical which may be further substituted, or a carbamic acid ester radical, when $n$ represents the number 1, and for a single C—N-linkage, when $n$ represents the number 2, and Z for hydrogen, methyl or methoxy, or together with —N—$CH_2$—$R_2$ and the vicinal benzene nucleus, for a tetrahydroquinoline ring.

Especially interesting dyestuffs are the monoazo dyestuffs which correspond to the formula

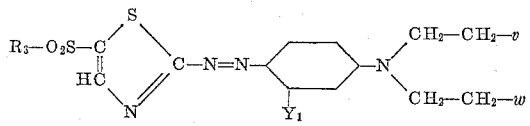

wherein $R_3$ has the above named meaning, $Y_1$ represents hydrogen, chlorine or methyl, $v$ represents hydrogen, methyl, ethyl, hydroxy, acetoxy or the radical of phenyl carbamic acid, and $w$ represents cyano, acetoxy or the radical of phenylcarbamic acid.

A number of these new, poorly water-soluble azo dyestuffs dye polyamide fibers (nylon, "Perlon" (registered trade name)), cellulose esters such as cellulose acetate and triacetate, polyester fibers ("Terylene," "Dacron" (registered trade names)) and polyvinyl fibers from aqueous suspension in brilliant red and violet shades. The dyeings are notable for their excellent fastness to light, washing, perspiration, cross dyeing, sea water, gas fumes, sublimation and pleating. The dyeings are dischargeable white and the dyestuffs give a clear reserve of cotton and viscose rayon. The wool reserve is very good as well, especially in the case of blended fabrics when the dyed material is after-treated with sodium hydrosulfite to clear the wool fiber. On the Orlon polyester fibers only light depths of shade are obtainable; even so they show outstanding light fastness down to $\frac{1}{25}$ of standard depth. Some of the new dyestuffs are also suitable for coloring lacquer media, oils, synthetic resins and artificial fibers in the mass. The cellulose ester filaments dyed in the mass are fast to light, washing, cross dyeing, alkaline chlorine bleaching, oxalic acid, peroxide bleaching, gas fumes and dry cleaning, and resistant to hydrosulfite.

The process for the production of the poorly water-soluble azo dyestuffs consists in diazotizing $n$ mols of an amine of the formula

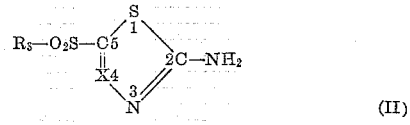

wherein X and $R_3$ possess the aforecited meanings, and coupling the diazo compound with 1 mol of a coupling component of the formula

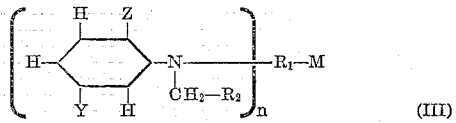

wherein $R_1$, $R_2$, M, X, Y and $n$ possess the above-named meanings.

The diazo compounds are coupled with the coupling components in acid medium, if desired in presence of a buffer substance. The azo dyestuffs thus formed are isolated by one of the common basic operations, for example, filtration, reduction of the solvent to a small volume followed by filtration, distilling off the solvent and filtration, or precipitation from the solvent with a suitable agent and subsequent filtration.

In the following examples all parts and percentages are by weight and the temperatures in degrees centigrade. The melting points are uncorrected.

EXAMPLE 1

180 parts of concentrated sulfuric acid are heated and on reaching 60–65° 15.2 parts of sodium nitrite are added. The mixture is stirred for 1 hour at this temperature and the nitrosylsulfuric acid thus formed is then cooled to 5°. At the same temperature 30 parts of propionic acid and 170 parts of glacial acetic acid are added dropwise. The resultant solution is used to diazotize a solution of 35.6 parts of 2-amino-5-methylsulfonylthiazole in 30 parts of propionic acid and 170 parts of glacial acetic acid. After agitation for 4 hours at 0–5° the excess nitrosylsulfuric acid is destroyed with 20 parts of urea. The diazo solution thus obtained is mixed at 0–5° with a solution of 56 parts of 1-bis-(acetoxyethyl)-amino-3-methylbenzene in 170 parts of glacial acetic acid. The coupling mixture is adjusted with sodium acetate to react neutral on Congo red indicator paper. The coupling reaction is completed in a short time. After 2 hours the reaction mass is diluted with 1000 parts of ice-water and the new dyestuff of the formula

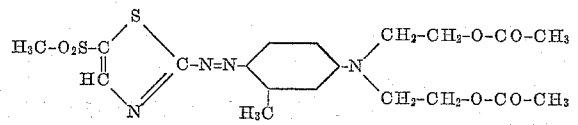

is separated in the normal manner. It is poorly soluble in ethanol and can be recrystallized from dioxane. The pure dyestuff melts at 164°; when applied at high temperature from aqueous suspension, preferably in presence of compounds with dispersing action, it dyes polyester, acetate and triacetate fibers in brilliant wine-red shades which show very good fastness to light, washing, perspiration, cross dyeing, sea water, gas fumes, sublimation and pleating. The dyeings are dischargeable white and the dyestuff gives a clear reserve of cotton and viscose rayon. The wool reserve is very good as well, especially in the case of blended fabrics when the dyed material is after-treated with sodium hydrosulfite to clear the wool fiber. On the Orlon polyester fibers only light depths of shade are obtainable; even so they show outstanding light fastness down to 1/25 of standard depth.

The dyeing method for polyester fibers is as follows:

The dyebath is prepared with 1 part of the dyestuff of the present example dispersed with the aid of Turkey red oil, 6 parts of a sulfonated fatty alcohol and 3000 parts of water. A length of "Dacron" polyester fiber, 100 parts by weight, is introduced into this bath at room temperature. The temperature is increased to 60° in 30 minutes and after the addition of 1.5 parts of 2-hydroxy-1.1'-diphenyl the bath is heated further to 100° and maintained at this temperature for 1 hour. The dyed material is then removed, rinsed with water and dried. It is dyed in a wine-red shade which is fast to light, washing, perspiration, cross dyeing, sea water, gas fumes and heat setting treatments.

In Table I below further dyestuffs are disclosed which are suitable for dyeing polyester, acetate and triacetate fibers. They correspond to the formula

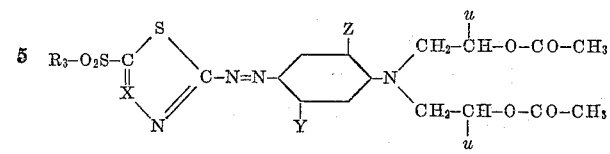

Table 1

| Ex. No. | X | Y | Z | u | R₃ | Shade on acetate |
|---|---|---|---|---|---|---|
| 2 | C—H | H | H | H | CH₃ | Red. |
| 3 | N | H | H | H | CH₃ | Scarlet. |
| 4 | C—CH₃ | H | H | H | CH₃ | Red. |
| 5 | C—C₂H₅ | H | H | H | CH₃ | Do. |
| 6 | C—C₄H₉ | H | H | H | CH₃ | Do. |
| 7 | C—CF₃ | H | H | H | CH₃ | Do. |
| 8 | C—H | H | H | CH₃ | CH₃ | Do. |
| 9 | C—CH₃ | H | H | CH₃ | CH₃ | Do. |
| 10 | C—H | Cl | H | H | CH₃ | Scarlet. |
| 11 | C—H | Br | H | H | CH₃ | Do. |
| 12 | C—H | Cl | H | CH₃ | CH₃ | Do. |
| 13 | C—CH₃ | Cl | H | H | CH₃ | Do. |
| 14 | C—CH₃ | Cl | H | CH₃ | CH₃ | Do. |
| 15 | C—H | C₂H₅ | H | H | CH₃ | Wine-red. |
| 16 | C—H | CH₃ | O—CH₃ | H | CH₃ | Red-violet. |
| 17 | C—H | CH₃ | H | H | CH₃ | Do. |
| 18 | C—H | NH—CO—CH₃ | H | H | CH₃ | Do. |
| 19 | C—H | NH—CO—C₂H₅ | H | H | CH₃ | Do. |
| 20 | C—H | NH—CO—CF₃ | H | H | CH₃ | Wine-red. |
| 21 | C—CH₃ | NH—CO—CH₃ | H | H | CH₃ | Red-violet. |
| 22 | C—H | NH—CO—CH₃ | O—CH₃ | H | CH₃ | Do. |
| 23 | C—H | H | H | H | C₂H₅ | Red. |
| 24 | C—H | H | H | H | C₄H₉ | Do. |
| 25 | C—H | H | H | H | CH=CH₂ | Do. |
| 26 | C—H | H | H | H | CH₂—CH=CH₂ | Do. |
| 27 | C—H | H | H | H | CH₂—CH₂—Cl | Do. |
| 28 | C—H | H | H | H | CH₂—CH₂—CN | Do. |
| 29 | C—H | H | H | H | CH₂—CH₂—Br | Do. |
| 30 | C—H | H | H | H | CH₂—CHF₂ | Do. |
| 31 | C—H | H | H | H | CH₂—CF₃ | Do. |
| 32 | C—H | H | H | H | CH₂—CH₂—OH | Do. |
| 33 | C—H | H | H | H | CH₂—CH(OH)—CH₃ | Do. |
| 34 | C—H | H | H | H | NH₂ | Do. |
| 35 | C—H | H | H | H | NH—CH₃ | Do. |
| 36 | C—H | H | H | H | NH—C₂H₅ | Do. |
| 37 | C—H | H | H | H | NH—CH₂—CH₂—OH | Do. |
| 38 | C—H | H | H | H | NH—CH₂—CH(OH)—CH₃ | Do. |
| 39 | C—H | H | H | H | NH—CH₂—CH₂—CH₂—O—CH₃ | Do. |
| 40 | C—H | H | H | H | N(CH₃)₂ | Do. |
| 41 | C—H | H | H | H | N(CH₃)—CH₂—CH₂—OH | Do. |
| 42 | C—H | H | H | H | N(C₂H₅)—CH₂—CH₂—OH | Do. |
| 43 | C—H | H | H | H | NH—CH₂—CH₂—CN | Do. |
| 44 | C—H | H | H | H | NH—CH(CH₃)₂ | Do. |
| 45 | C—CH₃ | H | H | H | CH₂—CH₂—CN | Do. |
| 46 | C—CH₃ | H | H | H | NH₂ | Do. |
| 47 | C—CH₃ | H | H | H | NH—CH₃ | Do. |
| 48 | C—CH₃ | H | H | H | N(CH₃)₂ | Do. |
| 49 | C—H | Cl | H | H | N(CH₃)₂ | Scarlet. |
| 50 | C—H | Cl | H | H | NH—CH₃ | Do. |
| 51 | C—H | H | H | CH₃ | NH—CH₃ | Red. |
| 52 | C—H | H | H | CH₃ | N(CH₃)₂ | Do. |
| 53 | C—CH₃ | Cl | H | H | NH—CH₃ | Scarlet. |
| 54 | N | Cl | H | H | CH₃ | Do. |
| 55 | N | CH₃ | H | H | CH₃ | Red. |

EXAMPLE 56

8.9 parts of 2-amino-5-methylsulfonylthiazole are dissolved in 200 parts of 85% phosphoric acid and diazotized with 3.6 parts of solid sodium nitrite, added with stirring at 0–5°. A creamy yellow mass is obtained which is mixed with a solution of 11 parts of 1-bis-(hydroxyethyl)-amino-3-methylbenzene in 20 parts of glacial acetic acid. The dark red reaction mass is agitated for a further 30 minutes and then transferred into 1000 parts of water to form a dyestuff suspension which is subsequently filtered off, washed free of acid and dried. The new dyestuff which has the formula

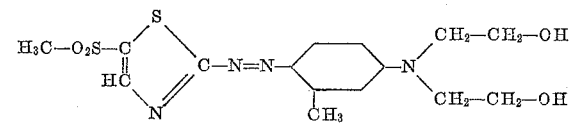

is obtained in the pure form upon recrystallization from ethanol and then melts at 211°. An analysis of the product yields the following values:

C found 47.03%; calculated 46.95%.
H found 5.54%; calculated 5.21%.

O found 16.70%; calculated 16.66%.
S found 16.54%; calculated 16.66%.

Applied from aqueous suspension at high temperature, preferably in presence of compounds with dispersing action, the new dyestuff dyes acetate, triacetate and polyamide fibers in wine-red to red-violet shades which show very good fastness to washing, perspiration, cross dyeing, sea water, gas fumes, sublimation and pleating. The light fastness is also good. The dyestuff reserves wool, cotton and viscose, and the dyeings are dischargeable giving clear white effects.

The dyestuffs set out in Table 2 have the formula

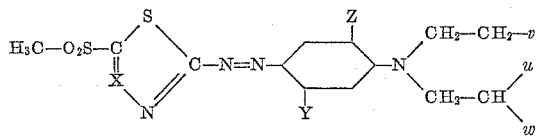

and possess similar properties combined in some cases with higher fastness to light.

Table 3

| Ex. No. | X | Y | s | t | u | w | Shade on acetate |
|---|---|---|---|---|---|---|---|
| 106 | C—H | Cl | H | H | H | OH | Red. |
| 107 | C—H | Cl | H | H | OH | $CH_2$—OH | Do. |
| 108 | C—H | Cl | H | H | OH | $CH_3$ | Do. |
| 109 | C—H | Cl | $CH_3$ | H | H | OH | Do. |
| 110 | C—H | Cl | $CH_3$ | H | OH | $CH_2$—OH | Do. |
| 111 | C—H | Cl | $CH_3$ | H | OH | $CH_3$ | Do. |
| 112 | C—H | $CH_3$ | H | H | H | OH | Red-violet. |
| 113 | C—H | $CH_3$ | H | H | OH | $CH_2$—OH | Do. |
| 114 | C—H | $CH_3$ | H | H | OH | $CH_3$ | Do. |
| 115 | C—H | $CH_3$ | H | OH | H | OH | Do. |
| 116 | C—H | $CH_3$ | H | OH | OH | $CH_2$—OH | Do. |
| 117 | C—H | $CH_3$ | H | OH | OH | $CH_3$ | Do. |
| 118 | N | Cl | H | H | H | OH | Red. |
| 119 | N | Cl | H | H | OH | $CH_2$—OH | Do. |
| 120 | N | Cl | H | H | OH | $CH_3$ | Do. |
| 121 | C—$CH_3$ | Cl | H | H | H | OH | Do. |
| 122 | C—$CH_3$ | Cl | H | H | OH | $CH_2$—OH | Do. |
| 123 | C—$CH_3$ | Cl | H | H | OH | $CH_3$ | Do. |
| 124 | C—H | $CH_3$ | $CH_3$ | H | H | OH | Red-violet. |
| 125 | C—H | $CH_3$ | $CH_3$ | H | OH | $CH_2$—OH | Do. |
| 126 | C—H | $CH_3$ | $CH_3$ | H | OH | $CH_3$ | Do. |
| 127 | C—$CH_3$ | $CH_3$ | $CH_3$ | H | H | OH | Do. |
| 128 | C—$CH_3$ | $CH_3$ | $CH_3$ | H | OH | $CH_2$—OH | Do. |

Table 2

| Ex. No. | X | Y | Z | u | v | w | Shade on acetate |
|---|---|---|---|---|---|---|---|
| 57 | C—H | H | H | H | H | OH | Red. |
| 58 | C—H | H | H | H | OH | OH | Do. |
| 59 | C—H | Cl | H | H | OH | OH | Do. |
| 60 | C—$CH_3$ | H | H | H | H | OH | Do. |
| 61 | C—H | H | H | $CH_3$ | H | OH | Do. |
| 62 | C—H | $CF_3$ | H | $CH_2$—OH | H | OH | Do. |
| 63 | C—H | NH—CO—$CH_3$ | H | H | OH | OH | Violet. |
| 64 | C—H | NH—CO—$CH_3$ | O—$CH_3$ | H | OH | OH | Do. |
| 65 | C—H | NH—CO—$CH_3$ | H | $CH_2$—OH | H | OH | Do. |
| 66 | C—H | NH—CO—$CH_3$ | O—$CH_3$ | $CH_2$—OH | H | OH | Do. |
| 67 | C—H | NH—CO—$C_2H_5$ | H | H | OH | OH | Do. |
| 68 | C—H | H | H | F | OH | F | Red. |
| 69 | N | H | H | F | OH | F | Do. |
| 70 | C—$CH_3$ | H | H | F | OH | F | Do. |
| 71 | C—H | $CH_3$ | H | H | H | OH | Wine-red. |
| 72 | C—H | $CH_3$ | H | $CH_2$—OH | H | OH | Do. |
| 73 | C—H | $CH_3$ | H | F | OH | F | Red. |
| 74 | C—H | H | H | CN | OH | $CHF_2$ | Do. |
| 75 | C—H | H | H | CN | OH | $CF_3$ | Do. |
| 76 | C—H | $CH_3$ | H | CN | OH | $CHF_2$ | Do. |
| 77 | C—H | $CH_3$ | H | CN | OH | $CF_3$ | Do. |
| 78 | C—H | H | H | F | O—CO—$CH_3$ | F | Scarlet. |
| 79 | C—H | Cl | H | F | O—CO—$CH_3$ | F | Do. |
| 80 | C—H | $C_2H_5$ | H | F | O—CO—$CH_3$ | F | Red. |
| 81 | C—H | $CH_3$ | H | F | O—CO—$CH_3$ | F | Do. |
| 82 | C—$CH_3$ | H | H | F | O—CO—$CH_3$ | F | Scarlet. |
| 83 | C—H | H | H | H | H | O—$CH_3$ | Red. |
| 84 | C—H | H | H | H | H | O—$C_2H_5$ | Do. |
| 85 | C—H | $CH_3$ | H | H | $C_2H_5$ | OH | Wine-red. |
| 86 | C—H | $CH_3$ | H | H | CO—O—$CH_3$ | H | Do. |
| 87 | C—H | H | H | OH | CO—O—$CH_3$ | H | Red. |
| 88 | C—H | $CH_3$ | H | H | CO—O—$CH_3$ | H | Wine-red. |
| 89 | C—H | H | H | H | CO—O—$CH_3$ | H | Red. |
| 90 | C—H | $CH_3$ | H | H | CO—O—$C_2H_5$ | H | Wine-red. |
| 91 | C—H | H | H | OH | CO—O—$C_2H_5$ | H | Red. |
| 92 | C—H | $CH_3$ | H | H | CO—O—$C_2H_5$ | H | Wine-red. |
| 93 | C—H | H | H | H | CO—O—$C_2H_5$ | H | Red. |
| 94 | C—H | H | H | H | H | O—CO—NH—$C_2H_5$ | Do. |
| 95 | C—H | Cl | H | H | H | O—CO—NH—$C_2H_5$ | Do. |
| 96 | C—H | $CH_3$ | H | H | H | O—CO—NH—$C_2H_5$ | Wine-red. |
| 97 | C—$CH_3$ | H | H | H | H | O—CO—NH—$C_2H_5$ | Red. |
| 98 | C—H | H | H | H | $CH_3$ | O—CO—NH—$C_2H_5$ | Do. |
| 99 | C—H | $CH_3$ | H | H | $CH_3$ | O—CO—NH—$C_2H_5$ | Wine-red. |
| 100 | C—H | H | H | H | O—CO—NH—$C_2H_5$ | O—CO—NH—$C_2H_5$ | Red. |
| 101 | C—H | Cl | H | H | O—CO—NH—$C_2H_5$ | O—CO—NH—$C_2H_5$ | Do. |
| 102 | C—H | H | H | H | O—CO—NH—$C_2H_5$ | O—CO—NH—$C_2H_5$ | Wine-red. |
| 103 | C—$CH_3$ | H | H | H | O—CO—NH—$C_2H_5$ | O—CO—NH—$C_2H_5$ | Red. |
| 104 | C—H | $CH_3$ | $OCH_3$ | H | H | OH | Wine-red. |
| 105 | C—H | $CH_3$ | $OCH_3$ | H | $C_2H_5$ | OH | Do. |

Equally good affinity and in certain cases still greater brilliancy of shade are shown by the dyestuffs of formula

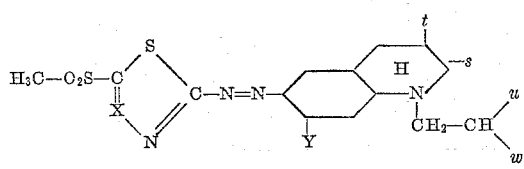

which are produced by the above-described procedures.

EXAMPLE 129

When the 11 parts of 1-bis-(hydroxyethyl)-amino-3-methylbenzene used in Example 56 are replaced by 10 parts of N-cyanoethyl - N - hydroxyethylaminobenzene, a dyestuff of formula

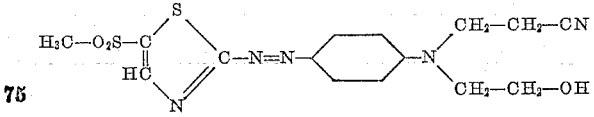

is obtained which on recrystallization from dioxane melts at 175°. It dyes acetate and triacetate fibers from aqueous dispersion in brilliant red shades of outstanding fastness to light, gas fumes, sublimation and pleating. The dyestuff gives a very good reserve of cotton, viscose and wool and is readily dischargeable from other fibers. Its light fastness on polyamide fibers is slightly lower than on acetate.

A dyebath is set with 1 part of the dyestuff of this example, previously dispersed by means of Turkey red oil, 6 parts of a sulfonated fatty alcohol and 3000 parts of water. 100 parts of acetate fabric are entered at room temperature and the temperature increased to 80° in 1 hour, this temperature being maintained for a further hour. After this time dyeing is completed; the material is removed, rinsed and dried.

To improve the dispersion, the dyestuff can be previously ground with suitable wetting, dispersing or emulsifying agents, preferably in presence of inorganic salts, for example Glauber's salt. Alternatively, it can be intimately mixed with a dispersing agent to give an aqueous paste which is then converted into a dyestuff powder by drying under suitable conditions.

The same standard of all-around fastness with a slightly more yellowish shade is obtained with the dyestuffs of the formulae

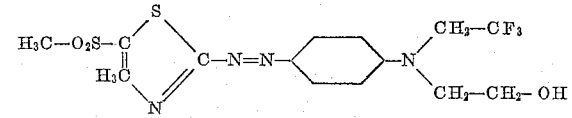

and

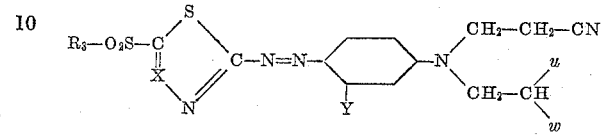

In Table 4 below are enumerated dyestuffs with similar properties and in some instances better light fastness. They have the formula

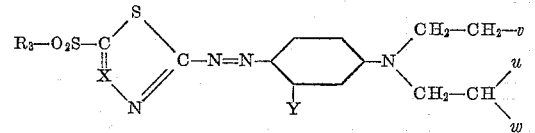

Table 4

| Ex. No. | X | Y | u | w | R₃ | Shade on acetate |
|---|---|---|---|---|---|---|
| 130 | C—H | H | H | O—CO—CH₃ | CH₃ | Scarlet. |
| 131 | C—H | Cl | H | OH | CH₃ | Do. |
| 132 | C—H | CH₃ | H | OH | CH₃ | Wine-red. |
| 133 | C—H | CH₃ | H | O—CO—CH₃ | CH₃ | Red. |
| 134 | C—H | H | H | H | CH₃ | Do. |
| 135 | C—H | CH₃ | H | H | CH₃ | Wine-red. |
| 136 | C—H | H | CH₃ | OH | CH₃ | Red. |
| 137 | C—H | H | H | O—CO—NH—C₂H₅ | CH₃ | Do. |
| 138 | C—CH₃ | H | H | OH | CH₃ | Do. |
| 139 | C—CH₃ | H | H | O—CO—CH₃ | CH₃ | Scarlet. |
| 140 | C—C₄H₉ | H | H | OH | CH₃ | Red. |
| 141 | C—C₂H₅ | H | H | O—CO—CH₃ | CH₃ | Scarlet. |
| 142 | C—CF₃ | H | H | OH | CH₃ | Red. |
| 143 | C—CF₃ | H | H | O—CO—CH₃ | CH₃ | Scarlet. |
| 144 | C—H | H | H | OH | C₄H₉ | Red. |
| 145 | C—H | H | H | OH | CH₂—CH=CH₂ | Do. |
| 146 | C—H | H | H | OH | CH₂—CH₂—CN | Do. |
| 147 | C—H | H | H | H | NH—CH₃ | Do. |
| 148 | C—H | H | H | OH | NH—CH₃ | Do. |
| 149 | C—H | H | H | O—CO—CH₃ | N(CH₃)₂ | Scarlet. |
| 150 | C—H | H | H | OH | N(CH₃)₂ | Red. |
| 151 | C—H | H | H | OH | NH—C₃H₇ | Do. |
| 152 | C—CH₃ | H | H | OH | NH—CH₃ | Do. |
| 153 | C—CH₃ | H | H | OH | N(CH₃)₂ | Do. |

The higher molecular dyestuffs of the general formula

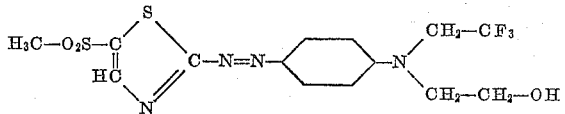

possess in general lower affinity for hydrophobic fibers. They are however excellent for coloring oils, lacquer media, synthetic resins and artificial fibers in the mass. Dyestuffs of such high molecular weight naturally possess superior wet fastness properties to those hitherto known; in some cases the maximum fastness to boiling, cross dyeing and saponification is obtained. The dyestuffs described in the following Table 5 are specially interesting; they correspond to the above formula and are characterized by the symbols X, Y, u, v, w and R₃.

Table 5

| Ex. No. | X | Y | u | v | w | R₃ |
|---|---|---|---|---|---|---|
| 154 | C—H | H | H | H | O—CO—NH—C₆H₅ | CH₃ |
| 155 | C—H | CH₃ | H | H | O—CO—NH—C₆H₅ | CH₃ |
| 156 | C—H | H | H | O—CO—NH—C₆H₅ | O—CO—NH—C₆H₅ | CH₃ |
| 157 | C—H | Cl | H | O—CO—NH—C₆H₅ | O—CO—NH—C₆H₅ | CH₃ |
| 158 | C—H | CH₃ | H | O—CO—NH—C₆H₅ | O—CO—NH—C₆H₅ | CH₃ |
| 159 | C—H | H | CH₃ | H | O—CO—NH—C₆H₅ | CH₃ |
| 160 | C—CH₃ | Cl | H | O—CO—NH—C₆H₅ | O—CO—NH—C₆H₅ | CH₃ |
| 161 | N | Cl | H | O—CO—NH—C₆H₅ | O—CO—NH—C₆H₅ | CH₃ |
| 162 | C—H | Cl | H | O—CO—NH—C₆H₅ | O—CO—NH—C₆H₅ | N(CH₃)₂ |
| 163 | C—H | Cl | H | O—CO—CH₃ | O—CO—CH₃ | N(CH₃)—C₆H₅ |
| 164 | C—H | Cl | H | O—CO—NH—C₆H₅ | O—CO—NH—C₆H₅ | N(CH₃)—C₆H₅ |
| 165 | C—H | Cl | H | O—CO—CH₃ | O—CO—CH₃ | N(C₂H₅)—C₆H₅ |
| 166 | C—H | Cl | H | O—CO—NH—C₆H₅ | O—CO—NH—C₆H₅ | N(C₂H₅)—C₆H₅ |
| 167 | C—H | Cl | H | O—CO—CH₃ | O—CO—CH₃ | N(CH₂—CH₂—OH)—C₆H₅ |
| 168 | C—H | Cl | H | O—CO—NH—C₆H₅ | O—CO—NH—C₆H₅ | N(CH₂—CH₂—OH)—C₆H₅ |
| 169 | C—H | H | H | O—CO—CH₃ | O—CO—CH₃ | NH—C₆H₅ |
| 170 | C—H | Cl | H | O—CO—NH—C₆H₅ | O—CO—NH—C₆H₅ | NH—C₆H₅ |
| 171 | C—H | Cl | H | O—CO—CH₃ | O—CO—CH₃ | NH—⟨C₆H₄⟩—CH₃ |

Table 5—Continued

| Ex. No. | X | Y | u | v | w | R₃ |
|---|---|---|---|---|---|---|
| 172 | C—H | Cl | H | O—CO—CH₃ | O—CO—CH₃ | NH—⬡—H |
| 173 | C—H | Cl | H | O—CO—NH—C₆H₅ | O—CO—NH—C₆H₅ | NH—⬡—H |
| 174 | C—H | Cl | H | O—CO—CH₃ | O—CO—CH₃ | NH—CH₂—C₆H₅ |
| 175 | C—H | Cl | H | O—CO—C₂H₅ | O—CO—C₂H₅ | NH—CH₂—CH₂—C₆H₅ |
| 176 | C—H | Cl | H | O—CO—CH₃ | O—CO—CH₃ | NH—⬡—CH₂OH |
| 177 | C—H | Cl | H | O—CO—NH—C₆H₅ | O—CO—NH—C₆H₅ | NH—CH₂—⬡ |
| 178 | C—H | Cl | H | O—CO—NH—C₆H₅ | O—CO—NH—C₆H₅ | NH—CH₂—CH₂—C₆H₅ |
| 179 | C—H | Cl | H | O—CO—NH—C₆H₅ | O—CO—NH—C₆H₅ | NH—⬡—CH₂OH |
| 180 | C—CH₃ | Cl | H | O—CO—NH—C₆H₅ | O—CO—NH—C₆H₅ | N(CH₃)₂ |
| 181 | C—⬡ | Cl | H | O—CO—NH—C₆H₅ | O—CO—NH—C₆H₅ | CH₃ |
| 182 | C—⬡—CH₃ | Cl | H | O—CO—NH—C₆H₅ | O—CO—NH—C₆H₅ | N(CH₃)₂ |
| 183 | C—⬡(CH₃)—CH₃ | Cl | H | O—CO—NH—C₆H₅ | O—CO—NH—C₆H₅ | CH₃ |
| 184 | C—⬡—C₂H₅ | Cl | H | O—CO—C₂H₅ | O—CO—C₂H₅ | CH₃ |
| 185 | C—⬡—Cl | Cl | H | O—CO—NH—C₆H₅ | O—CO—NH—C₆H₅ | CH₃ |
| 186 | C—⬡(Cl)—Cl | Cl | H | O—CO—NH—C₆H₅ | O—CO—NH—C₆H₅ | N(CH₃)₂ |
| 187 | C—H | NH—CO—C₃H₇ | H | O—CO—CH₃ | O—CO—CH₃ | N(CH₃)—C₆H₅ |
| 188 | C—H | NH—CO—C₉H₁₉ | H | O—CO—CH₃ | O—CO—CH₃ | CH₃ |
| 189 | C—H | NH—CO—C₁₇H₃₅ | H | O—CO—CH₃ | O—CO—CH₃ | CH₃ |
| 190 | C—H | NH—CO—C₁₇H₃₃ | H | O—CO—CH₃ | O—CO—CH₃ | CH₃ |
| 191 | C—H | NH—CO—C₉H₁₉ | O—CO—CH₃ | H | CH₂—O—CO—CH₃ | CH₃ |

A number of the dyestuffs of Examples 154 to 191 are readily soluble in acetone and are especially suitable for dope-dyeing acetate in brilliant fast-to-light red shades. Those dyestuffs in which Y stands for chlorine yield slightly yellower shades and are the fastest to gas fumes.

100 parts of cellulose acetate are mixed with 300 parts of a mixture of solvents (93% acetone, 7% methanol) for a short time and left overnight to swell. 1 part of the dyestuff obtained according to Example 157 is dissolved by simple shaking in 60 parts of the solvent mixture and added to the cellulose acetate solution. The mixture is stirred in an open vessel until 60 parts of the solvent have evaporated.

The colored mass is pumped into the spinning machine in the normal way and spun. The filament is dyed a bright red which is outstandingly fast to light, washing, cross dyeing, alkaline chlorine bleaching, oxalic acid, peroxide bleaching, gas fumes and dry cleaning, and resistant to hydrosulfite.

Besides the already named dyestuffs, the disazo dyestuffs produced by combining 2 mols of a 2-diazo-5-alkyl- or -alkylene-sulfonylthiazole, a 2-diazothiazole-5-sulfonic acid amide, a 2-diazo-5-alkyl- or -alkylenesulfonylthiodiazole or a 2-diazothiodiazole-5-sulfonic acid amide with 1 mol of an amine of the formula

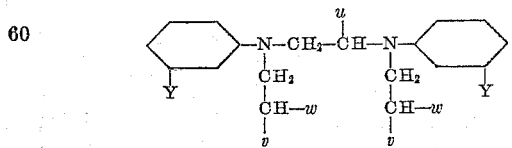

are suitable for coloring lacquer media, oils, synthetic resins and artificial fibers in the mass. In the foregoing formula the preferred meanings of Y, w and u are hydrogen or methyl, and of v hydrogen, methyl, ethyl, cyano, hydroxy, acetoxy or the phenylcarbamic acid ester group. The two following dyestuffs are of special interest for the production of brilliant spun-dyed red shades on acetate with high light fastness and very good wet fastness properties.

EXAMPLE 192

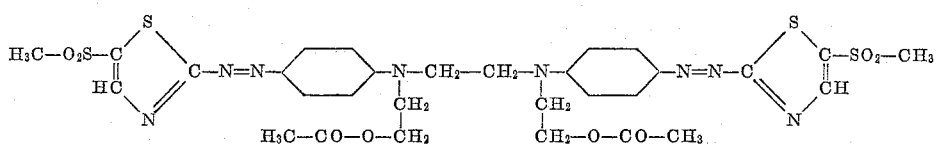

EXAMPLE 193

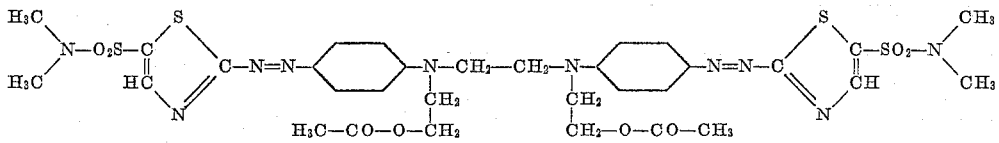

These two dyestuffs dye acetate in the dope in brilliant red shades fast to light and outstandingly fast to wet processes.

Formulae of representative dyestuffs of the foregoing examples are as follows:

EXAMPLE 2

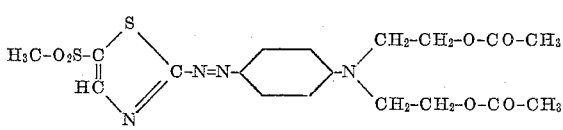

EXAMPLE 40

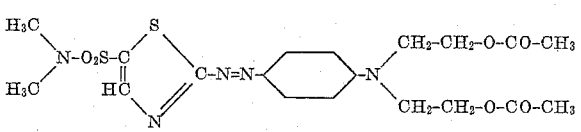

EXAMPLE 149

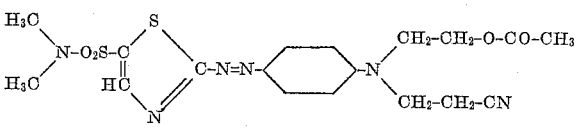

EXAMPLE 169

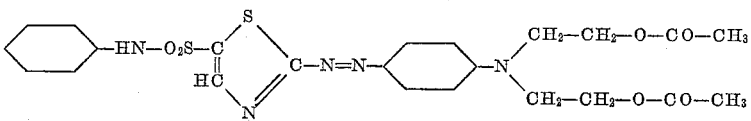

Having thus disclosed the invention what I claim is:

1. Sparingly water-soluble azo dyestuff which corresponds to the formula

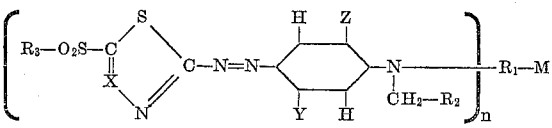

wherein X is a member selected from the group consisting of a nitrogen atom, C—H, C-lower alkyl, C—$CF_3$, C-phenyl, C-(methylphenyl), C-(ethylphenyl), C-(dimethylphenyl), C-(dichlorophenyl) and C-(chlorophenyl), $R_3$ is a member selected from the group consisting of alkyl with 1 to 4 carbon atoms, alkylene with 1 to 4 carbon atoms, fluorinated ethyl, chloroethyl, bromoethyl, hydroxyalkyl with 1 to 4 carbon atoms, cyanoalkyl with 1 to 4 carbon atoms, amino, lower alkylamino, lower hydroxyalkylamino, lower alkoxyalkylamino, di-lower alkylamino, N-lower alkyl-N-lower hydroxyalkylamino, lower cyanoalkylamino, the cyclohexylamino group, the phenylmethylamino group, the phenylethylamino group, the phenylamino group, the methylphenylamino group, the ω-hydroxymethylphenylamino group, the N-methylphenylamino group, the N-ethyl phenylamino group and the N-hydroxyethyl-phenylamino group; Y is a member selected from the group consisting of a hydrogen atom, a chlorine atom, a bromine atom, low molecular alkyl, trifluoromethyl, trifluoroacetylamino and alkanoylamino with not more than 18 carbon atoms; $R_1$ is a member selected from the group consisting of ethylene, propylene and butylene; $R_2$ is a member selected from the group consisting of lower hydroxyalkyl, lower dihydroxyalkyl, lower alkoxyalkyl, lower acetoxyalkyl, lower propionyloxyalkyl, lower cyanoalkyl, polyfluoromethyl, fluorinated cyanoalkyl, lower carbalkoxyethyl and carbamic acid lower alkyl ester; $n$ represents one of the integers 1 and 2; M is a member selected from the group consisting of hydrogen, hydroxy, lower alkoxy, acetoxy, propionyloxy and carbamic acid ester, when $n$ represents the number 1, and stands for a single C-N-linkage, when $n$ represents the number 2; and Z is a member selected from the group consisting of hydrogen, methoxy and, together with —N—$CH_2$—$R_2$, tetrahydroquinoline ring.

2. The monoazo dyestuff of the formula

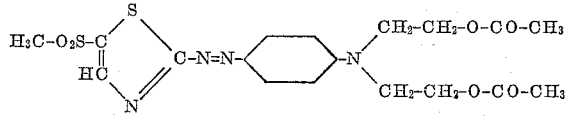

3. The monoazo dyestuff of the formula

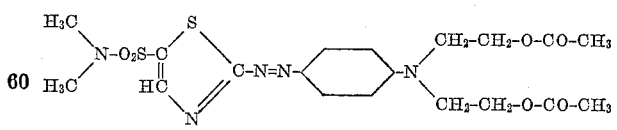

4. The monoazo dyestuff of the formula

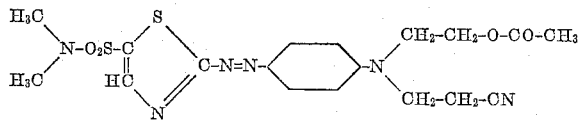

5. The monoazo dyestuff of the formula

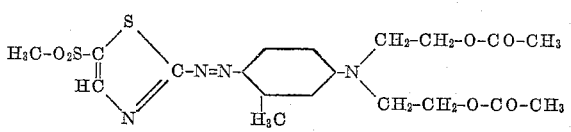

6. The monoazo dyestuff of the formula
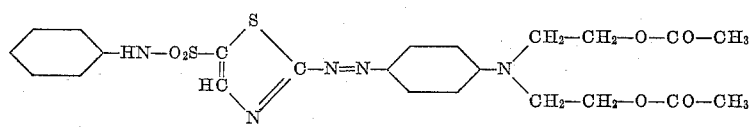
References Cited in the file of this patent
UNITED STATES PATENTS
| | | |
|---|---|---|
| 2,441,612 | Argyle et al. | May 18, 1948 |
| 2,785,157 | Straley et al. | Mar. 12, 1957 |
| 2,839,523 | Towne et al. | June 17, 1958 |
| 2,852,504 | Towne et al. | Sept. 16, 1958 |

UNITED STATES PATENT OFFICE
CERTIFICATE OF CORRECTION

Patent No. 3,007,915                          November 7, 1961

Ernest Merian

It is hereby certified that error appears in the above numbered patent requiring correction and that the said Letters Patent should read as corrected below.

In the heading to the printed specification, between lines 5 and 6, insert the following :

Claims priority, application Switzerland May 29, 1957

Signed and sealed this 6th day of November 1962.

(SEAL)
Attest:

ERNEST W. SWIDER                      DAVID L. LADD
Attesting Officer                         Commissioner of Patents